United States Patent [19]

O'Keefe et al.

[11] 4,258,026
[45] Mar. 24, 1981

[54] HYDROGEN IODIDE DECOMPOSITION

[75] Inventors: Dennis R. O'Keefe, San Diego; David G. Williamson, San Luis Obispo, both of Calif.

[73] Assignee: General Atomic Company, San Diego, Calif.

[21] Appl. No.: 23,887

[22] Filed: Mar. 26, 1979

[51] Int. Cl.³ ................................................. C01B 1/03
[52] U.S. Cl. .................................. 423/648 R; 423/507
[58] Field of Search ........................... 423/648 R, 507; 252/440, 472

[56] References Cited

U.S. PATENT DOCUMENTS

| 3,365,276 | 1/1968 | Childs et al. | 423/648 R |
| 3,668,148 | 6/1972 | Van Beek et al. | 252/440 |
| 3,922,235 | 11/1975 | DeLuca et al. | 252/472 |
| 3,995,016 | 11/1976 | Kittle | 423/648 R |
| 4,021,374 | 5/1977 | Petro et al. | 252/440 |
| 4,066,739 | 1/1978 | Chen | 423/648 R |
| 4,089,939 | 5/1978 | Norman et al. | 423/648 R |
| 4,089,940 | 5/1978 | Norman et al. | 423/648 R |
| 4,094,962 | 6/1978 | Cocuzza et al. | 423/648 R |
| 4,149,998 | 4/1979 | Tauster et al. | 252/461 |

FOREIGN PATENT DOCUMENTS 796049  6/1958  United Kingdom ................ 423/648 R

OTHER PUBLICATIONS

Babor, Basic College Chemistry, Second Edition, Thomas Y. Crowell Co. (1953), pp. 255-258.

Primary Examiner—O. R. Vertiz
Assistant Examiner—Wayne A. Langel
Attorney, Agent, or Firm—Fitch, Even, Tabin, Flannery & Welsh

[57] ABSTRACT

Hydrogen iodide is efficiently decomposed to hydrogen and iodine by treatment in the liquid phase with a platinum group metal catalyst. At temperatures between about 0° C. and about 150° C. and pressures sufficiently high to maintain the liquid phase, at least about 50 percent of the hydrogen iodide present can be decomposed at a reasonable rate of reaction. The hydrogen which is created is easily separated as a gas. Exemplary catalysts include platinum particles and supported catalysts, such as ruthenium on a titania substrate and platinum on a barium sulfate substrate.

10 Claims, No Drawings

HYDROGEN IODIDE DECOMPOSITION

The present invention relates to the decomposition of hydrogen iodide, and more particularly to a process for catalytically decomposing liquid hydrogen iodide to obtain gaseous hydrogen therefrom.

BACKGROUND OF THE INVENTION

Various processes have been proposed for producing hydrogen from water, many of which create oxygen as a by-product. In particular, totally thermochemical $H_2$ production processes which have the capability to create large amounts of hydrogen have the potential for alleviating problems in the chemical-fuel energy sector (i.e., oil, natural gas, etc.) because they utilize clean sources of heat energy, such as that developed by high temperature nuclear reactors, fusion reactors and concentrating solar collectors. In addition to using the $H_2$ so formed to create power, it can also be used as a chemical feedstock, for example in the manufacture of fertilizer.

One such "water-splitting" process produces hydrogen iodide as a part of a closed-cycle chain of reactions and is disclosed in U.S. Pat. No. 4,089,940, issued May 16, 1978 to John H. Norman et al. This process is based upon the Bunsen equation whereby sulfur dioxide, water and iodine are reacted to produce sulfuric acid and hydrogen iodide. The hydrogen iodide is separated from the reaction mixture and eventually decomposed in order to recover gaseous hydrogen.

DISCUSSION OF THE PRIOR ART

It is disclosed in the above-identified U.S. patent that gaseous hydrogen iodide can be pyrolyzed in a quartz vessel at a temperature of about 600° C. and that if a catalyst, such as platinum or ruthenium, is employed, the decomposition temperature might be reduced to 325° C.

British Pat. No. 796,049, issued June 4, 1958, discloses a vapor-phase process for catalytically decomposing hydrogen iodide which uses an amorphous or activated carbon catalyst. U.S. Pat. No. 3,365,276, issued Jan. 23, 1968 to Childs et al, discloses that a gaseous hydrogen halide can be decomposed at a temperature in the range of about 800° to 850° F. using a platinum group metal catalyst that has been electrolytically deposited as a thin film on a high surface area membrane. More recently, U.S. Pat. Nos. 4,066,739 and 4,094,962 issued Jan. 3, 1978 and June 13, 1978, respectively, discuss the decomposition of HI which results as a by-product from a process which recovers $H_2$ and elemental sulfur from hydrogen sulfide. The U.S. Pat. No. 4,066,739 discloses catalytic decomposition of gaseous HI at about 400° C. plus the subsequent recovery of $I_2$ by condensation at about 184° C. The U.S. Pat. No. 4,094,962 discloses the decomposition of HI in the presence of a palladium alloy membrane on a porous ceramic support at a temperature of about 800° C. and 30 atm. pressure.

Literature articles in the 1920's discussed the unimolecular decomposition of hydrogen iodide in the presence of a heated platinum or gold wire. Gaseous hydrogen iodide can be decomposed to an equilibrium conversion level of 17 percent at 300° C., the reaction being independent of total pressure and only moderately dependent on temperature, although rate is influenced by the presence of a catalyst. Better and more efficient processes for decomposing hydrogen iodide and by which higher conversion levels can be achieved are desirable, preferably at lower temperatures where corrosion effects are not as great.

To this end, U.S. Pat. No. 4,089,940 proposed that the decomposition reaction be run at temperatures compatible with the formation of condensed product $I_2$ thereby increasing the HI conversion by not allowing the liquid product $I_2$ to exceed its vapor pressure. In reality, the attempts, to date, to effect such an increase in conversion using this method have not been successful because the presence of liquid $I_2$ isolates the catalyst surface from the HI reactant.

BRIEF SUMMARY OF THE INVENTION

The present invention presents a viable alternative to the condensation of $I_2$ concept for HI conversion enhancement. It has been found that hydrogen iodide can be efficiently decomposed in liquid form at relatively low temperatures using appropriate catalysts. The result of decomposing HI in its liquid state is an enhanced conversion due to the fact that the chemical driving force of the $I_2$ is reduced below that of the pure $I_2$ liquid due to its dissolution in the HI liquid phase, with the added experimental observation that the reaction continues at a good rate even beyond the saturation level of $I_2$ in liquid HI. This result is ascribed to the fact that the HI, in the liquid form, is still able to contact the catalyst surface even though large quantities of $I_2$ either in the solid or liquid state, are present. Sufficiently high pressures are employed to maintain hydrogen iodide in liquid form. Catalysts in the form of ruthenium or platinum on titania and platinum on barium sulfate, as well as platinum in powder form, have proved particularly effective and long-lived for such relatively low-temperature HI decomposition.

DETAILED DESCRIPTION OF THE PREFERRED EMBODIMENTS

It has been found that excellent efficiency is achieved by the decomposition of hydrogen iodide in liquid form while requiring only a relatively low level energy input. Liquid hydrogen iodide can be fairly readily catalytically decomposed at temperatures between about 0° C. and about 150° C. The products of such decomposition are iodine, which is carried in the liquid hydrogen iodide, and gaseous hydrogen which bubbles out of the liquid system—thus simultaneously effecting separation of $H_2$ and its recovery. A sufficient HI partial pressure of between 3 and 81 atmospheres (the critical pressure of HI) is employed in order to maintain hydrogen iodide in liquid form. Total system pressures may rise above 200 atmospheres, depending on what partial pressure of hydrogen gas is desired for a particular process application. Total pressure should be understood to include the partial pressure of HI, $I_2$ and $H_2$. The 200 atm. pressure figure is obtained from thermodynamic considerations in which the partial vapor pressure of HI and $I_2$ are assumed to be preserved above the mixture. Conceivably, the total pressure might approach 300 atm.; however, it is believed the process has significant commercial advantages when operated between about 100 and about 200 atm. Clearly, the $H_2$ can be removed at any lower pressure if so desired. The critical temperature of pure hydrogen iodide (i.e., the temperature above which hydrogen iodide can only exist as a gas) is 150.8° C.; however, a solution of iodine in HI may have a pseudo critical temperature somewhat higher, which might be advantageously employed.

The decomposition process can be carried out as a batch reaction, or it can be rendered continuous using fairly standard chemical engineering practices. Such a continuous process may continuously add reactant HI in liquid form to a catalytic reaction zone from which a product stream of gaseous $H_2$ and a product stream of liquid $I_2$ are continuously withdrawn. Both such product streams are purified to remove HI (which is recycled to the reaction zone) resulting in separate pure streams of $H_2$ and $I_2$ product. Such a continuous process is advantageously operated so that the liquid stream being withdrawn contains between about 10 and about 50 weight percent $I_2$ although it may be run with $I_2$ present beyond the saturation level.

The catalyst must be capable of retaining its catalytic properties in the corrosive liquid hydrogen iodide environment and should not lose its catalytic effectiveness even in the presence of significant concentrations of iodine. It has been found that the platinum group metals and particularly platinum and ruthenium are effective catalysts for such low-temperature decomposition of liquid hydrogen iodide.

The catalyst may be employed in the form of small particles (less than about 5 microns) of metal powder, e.g., precipitated platinum powder or platinum black, that are suspended or maintained dispersed within the liquid HI. Preferably the catalytic metal is applied to a suitable inert substrate which has a relatively high surface area in order to present a large contact surface area to the hydrogen iodide. Inert refractory oxide substrates, such as titania, zirconia, alumina, silica, carbon and mixtures thereof may be used. Titania, zirconia and barium sulfate have proved to be especially effective inert substrates which can be loaded or coated with platinum group metals and which continue to exhibit excellent catalytic activity over a relatively long period of time.

An effective amount of catalyst can be applied by treating a high surface area titania substrate with a solution of, for example, platinum sulfite acid [$H_3Pt(SO_3)_2OH$], ruthenium sulfite acid or chloroplatinic acid. After contact for several hours, the treated substrate is drained and then heated, first at a mild temperature and finally at a temperature in the range of 500° to 600° C., to leave the essentially pure metal deposit. Testing shows that such a substrate so treated will contain the platinum group metal in an amount between about 0.5 weight percent and about 1.5 weight percent, based upon weight of the substrate.

Although any substantial concentration of the catalyst is effective in decomposing liquid hydrogen iodide, certain ratios of liquid hydrogen iodide to catalyst are preferred to assure practical rates of reaction. For example, when the catalyst is deposited upon a high surface area substrate, it is preferred that the metal should be present in an amount equal to at least about 14 milligrams per 100 grams of hydrogen iodide being processed in order to effect a reasonable rate of reaction. Although there is no detriment, other than expense, in using relatively high amount of the platinum group metal catalyst, it would not normally be employed in an amount greater than about 1400 mg./per 100 g. of HI.

In addition, it has been found that the inclusion of a small amount of water together with the hydrogen iodide appears to promote a more efficient decomposition. In general, water may be included in an amount of up to about 35 weight percent, based upon total weight of liquid. Preferably, less than about 5 weight percent of water is included, depending upon the catalyst being used. For example, processing liquid hydrogen iodide containing about 99 weight percent hydrogen iodide and 1 weight percent water at a temperature of about 30° C. with a platinum catalyst supported on a titania substrate results in an increase in the rate at which the decomposition reaction proceeds by a factor of about 7 compared to decomposition of anhydrous HI using the same catalyst. If, instead, a platinum catalyst on a zirconia substrate is used, an even higher rate of reaction is obtained when HI containing 1 wt. percent water is reacted. The comparative rate measured is that occurring after the decomposition reaction has proceeded for about 20 minutes. This surprising increase in the rate of the reaction can be used to effect a decrease in the overall amount of catalyst which is employed to process a given quantity of hydrogen iodide, and thus a reduction in the overall expense of the process.

EXAMPLE I

A catalyst substrate is prepared by combining an aqueous solution of barium hydroxide with sufficient titania to provide about 10 mole percent titania and treating the resultant mixture with $H_2SO_4$ to provide a product that is about 90 mole percent $BaSO_4$ and 10 mole percent $TiO_2$. The product is extruded and then dried and is found to exhibit particularly good substrate characteristics. Platinum is applied to the catalyst substrate by immersion for 1 hour in a solution of platinum sulfite acid. After heating overnight at 125° C. and then for 4 hours at 600° C., the material is found to contain about ½ weight percent platinum on the barium sulfate-titania substrate. A batch-type decomposition of liquid hydrogen iodide is carried out at a temperature of about 30° C. The initial HI pressure is maintained at about 10 atm. using about 160 mg. of Pt for 100 gms. of liquid hydrogen iodide. The overall pressure builds as $H_2$ is created, and when it reaches about 20 atm., vapor is periodically withdrawn to keep the pressure from exceeding this value. Under stabilized rate conditions, about 50 percent of the liquid hydrogen iodide initially present is decomposed to $H_2$ and $I_2$ after about 34 hours. The decomposition reaction is repeated at about 50° C. using a slightly higher initial pressure of about 15 atm., and about 50 percent decomposition is achieved after 11 hours.

EXAMPLE II

A catalyst substrate is prepared by combining reagent-grade titania powder with water containing about 1 weight percent polyvinyl acetate, as a binder, to form a paste that is extruded and then dried in air at about 125° C. for 2 hours. The extruded strands are broken into particles of appropriate size and fired for 2½ hours at 800° C. A ruthenium catalyst is applied to the substrate by immersion for 2 hours in a solution of ruthenium sulfite acid. After heating overnight at 125° C. and then for 3 hours in a reducing atmosphere at 500° C., the catalyst material is found to contain about 1 weight percent ruthenium on the titania substrate.

A batch-type decomposition of liquid hydrogen iodide is carried out at a temperature of about 50° C. as described in Example I using the prepared catalyst at a level of about 96 mg. of Ru per 100 gms. of liquid hydrogen iodide. Under stabilized rate conditions, it takes about 56 hours, to convert about 50 percent of the liquid hydrogen iodide initially present to $H_2$ and $I_2$, and a reasonable decomposition rate persists beyond this point.

EXAMPLE III

A catalyst substrate is prepared as set forth in Example II. Platinum is applied to the catalyst substrate by immersion for 2 hours in a solution of platinum sulfite acid. After heating overnight at 125° C. and then for 4½ hours at 600° C., the catalyst material is found to contain about 0.46 weight percent platinum on the titania substrate. A batch-type decomposition of hydrogen iodide is carried out at temperatures of 0° C., 30° C., and 50° C. and pressures sufficient to maintain the HI in liquid form, using about 70 mg. of Pt for 100 gms. of liquid hydrogen iodide. Measurement at these 3 temperatures shows the catalyst is effective in achieving decomposition at practical rates of reaction. Extrapolation of the measured data indicates that, if the decomposition were carried out at a temperature of 150° C., conversion of 30 weight percent of the HI to $H_2$ and $I_2$ could be effected in about 10 minutes, and that even better rates of reaction may be achieved when catalyst structures are optimized.

EXAMPLE IV

Fine granules (in the micron size range) of Pt metal are precipitated by the chemical reduction of chloroplatinic acid with hydrazine. About 0.2 g of this washed and dried platinum is added to about 100 g. of HI containing about 1 wt. percent $H_2O$. The mixture is stirred, and the $H_2$ production rate measured at both 30° and 50° C. The result is an $H_2$ production rate comparable to the platinum supported catalysts described in Examples I and III. Such a reactor concept would appear to be a viable method for HI liquid decomposition although extraction of the platinum powder from the liquid iodine and unreacted HI and its recycle would be required in such a process.

Although the invention has been described with regard to certain presently preferred embodiments, it should be understood that changes and modifications as would be obvious to one having the ordinary skill in the art may be made without departing from the scope of the invention which is set forth in the appended claims. Various features of the invention are further emphasized in the claims which follow.

What is claimed is:

1. A process for the decomposition of hydrogen iodide which comprises
    maintaining contact between a platinum group metal catalyst and hydrogen iodide for a time sufficient to decompose a substantial portion of said hydrogen iodide to hydrogen and iodine, and
    recovering gaseous $H_2$ which results therefrom,
    wherein the improvement comprises controlling the temperature and the pressure to maintain said hydrogen iodide in liquid form whereby greater conversion is obtained that is obtained for gaseous decomposition.

2. A process in accordance with claim 1 wherein said liquid hydrogen iodide contains $H_2O$ in an amount of between about 1 and about 35 weight percent, based on total of hydrogen iodide plus water.

3. A process in accordance with either claim 1 or 2 wherein reactant HI in liquid form is added continuously to a catalytic reaction zone, wherein a gaseous stream and a liquid stream are continuously withdrawn from said zone wherein said gaseous stream is purified to provide $H_2$ and HI which is recycled to said reaction zone and wherein said liquid stream is purified to provide $I_2$ and HI which is recycled to said reaction zone.

4. A process in accordance with claim 3 wherein said decomposition is effected to an extent that said liquid stream contains between about 10 weight percent and about 50 weight percent $I_2$, based upon weight of HI plus $I_2$.

5. A process in accordance with claim 4 wherein said liquid hydrogen iodide contains a minor amount of $H_2O$ in an amount less than about 5 weight percent, based on total weight of hydrogen iodide plus water.

6. A process according to claim 1 wherein said catalyst is a platinum group metal dispersed upon a titania substrate.

7. A process according to claim 6 wherein said catalyst is ruthenium.

8. A process in accordance with claim 1 wherein said contact is carried out at a temperature between about 0° C. and about 150° C. and at a total pressure of between about 4 atm. and about 300 atm.

9. A process according to claim 1 wherein said catalyst is in the form of platinum particles having a size of less than about 5 microns.

10. A process according to claim 1 wherein said catalyst is a platinum group metal dispersed upon a barium sulfate substrate.

* * * * *